(12) United States Patent
Cho (10) Patent No.: US 6,471,354 B1
(45) Date of Patent: Oct. 29, 2002

(54) APPARATUS FOR CREATING VISUAL POWER OF A BLIND PERSON

(76) Inventor: Sung Wook Cho, 102-805 Kum Ho Town, 923 Dong Chun Dong, Yon Su-Ku, InCheon-City 406-130 (KR)

(*) Notice: Subject to any disclaimer, the term of this patent is extended or adjusted under 35 U.S.C. 154(b) by 0 days.

(21) Appl. No.: 09/502,888

(22) Filed: Feb. 11, 2000

(51) Int. Cl.[7] ................................. A61B 3/02
(52) U.S. Cl. .................. 351/233; 382/114; 382/237; 348/63
(58) Field of Search .................. 351/205, 209, 351/210, 221, 222, 224, 233, 158, 237; 382/114; 348/63, 62, 61; 349/124

(56) References Cited

U.S. PATENT DOCUMENTS

| | | | | |
|---|---|---|---|---|
| 5,125,046 A | * | 6/1992 | Siwoff | 382/114 |
| 5,528,401 A | * | 6/1996 | Narutaki et al. | 349/124 |
| 5,530,495 A | * | 6/1996 | Lamprecht | 351/210 |
| 5,777,715 A | | 7/1998 | Kruegle et al. | 351/158 |
| 5,831,667 A | * | 11/1998 | Siminou | 348/63 |

* cited by examiner

Primary Examiner—George Manuel
(74) Attorney, Agent, or Firm—Howard & Howard

(57) ABSTRACT

Disclosed is an apparatus for creating visual power of a blind person, who has lost a visual ability due to various reasons, thereby recovering the visual ability of the blind person. The visual power creating apparatus includes a CCD camera for picking up the image of an object, a TFF LCD monitor for displaying the image picked up by the CCD camera, a light source for illuminating the TFT LCD monitor at the rear side of the TFT LCD monitor and adapted to increase the illuminance of the image displayed on the TFT LCD monitor, a control box for supplying electric power to the CCD camera and the TFT LCD monitor and transmitting the image from the CCD camera to the TFT LCD monitor via an image transmission line, and an optical system for enlarging the image displayed on the TFT LCD monitor to the actual size of the object.

11 Claims, 6 Drawing Sheets

APPARATUS FOR CREATING VISUAL POWER OF A BLIND PERSON

BACKGROUND OF THE INVENTION

1. Field of the Invention

The present invention relates to an apparatus for creating visual power of a blind person, and more particularly to a visual power creating apparatus for focusing an image onto the optic nerve of a visually handicapped or blind person, the optic nerve being active even though its activity is weak.

2. Description of the Prior Art

Generally, persons have various eye conditions, for example, a condition having an abnormal retina position, that is, a near or far retina position while having a normal crystalline lens curvature, or a condition having an abnormal crystalline lens curvature while having a normal retina position. When a person loses visual power and even visual sense due to a particular ey e problem, thereby losing even an ability to distinguish darkness and brightness, he is generally called a "blind person". Of course, a person having very weak visual power, who can distinguish darkness and brightness or recognize only movements of an object positioned just before the eyes, may also be classified as a blind person. Such persons having weak visual power, who are included in the majority of so-called "blind persons", cannot solve problems caused by their weak visual power even when they use glasses or other specific lenses because the weakness of visual power results from a weakness of the crystalline lens, iris, retina or optic nerve system.

In order to create visual power for blind persons, who lose visual power due to various eye problems such as shrinkage of optic nerve, disorder of the crystalline lens, or, in the case of having no crystalline lens, brain infarction, brain tumor, nystagmus, or retinal detachment, a visual power creating apparatus has been proposed by the inventor. This apparatus is disclosed in Korean Patent Application No. 98-36849 filed on Sep. 8, 1998, entitled "A Visual Power Creating Apparatus Using Optical and Electronic Units", and laid open on Dec. 5, 1998 while being assigned with the Patent Laid-open Publication No. 98-87669.

However, the prior art does not disclose a concrete configuration capable of allowing skilled persons to easily carry out the invention while achieving effects intended by the invention.

This will be described in more detail. In lines 10 to 13 of the abstract on page 1 in the publication, there is a description "The present invention mainly relates to an apparatus for focusing an image onto the optic nerve of a retina having no light sensibility, by use of an optical system having a new illumination system. For transfer of such an image, electronic units (a CCD camera and an LCD panel) are mounted which serve to transfer, in a real time, a moving image to the retina so that blind persons recognize the image, like as normal persons". In lines 4 to 7 of the specification on page 3 in the publication, there is also a description "The present invention provides a visual power creating apparatus for blind persons. This visual power creating apparatus creates visual power of the optic nerve of a retina having no ability to sense an optical image, by use of an optical system including a specific illumination system. The important technique in the present invention is a combination of a general optical system, in which an assistant lens is coupled to an eyeball in order to focus an image onto the retina, and a separate optical system adapted to transmit an accurate image to the eyeball and retina where the eyeball and retina are abnormally grown." Also, the publication discloses in lines 11 to 12 of the specification on page 3 a description "The present invention relates to developments of an optical system capable of allowing rays of light to reach an optional position (the optimum image focusing position) of an abnormally grown retina, and an illumination system adapted to generate strong impulse which is sensed by the optic nerve of the blind person." In lines 22 to 24 of the specification on page 3 in the publication, there is also a description "The present invention comprises an optical system for focusing an image at an optional position of the retina of the viewer, an illumination system for generating strong impulse having an intensity sensed by the degenerated optic nerve without any injury, and electronic units arranged on an optical path for the systems". However, all the above descriptions are associated with only the objects of the disclosed invention. In the publication, there is no description associated with a concrete configuration capable of accomplishing the described objects.

In particular, there is no description associated with concrete configurations of the optical system for focusing an image at an optional position of the retina of the viewer, the illumination system for generating strong impulse having an intensity sensed by the degenerated optic nerve without any injury, and the electronic units arranged on an optical path for the systems. Also, there is no description associated with interconnections of the optical system, illumination system and electronic units. For this reason, it is doubtful that the intended objects of the disclosed invention are accomplished.

Consequently, the disclosed invention is only an incomplete invention in that there is no description associated with concrete configurations for obtaining effects intended by the disclosed invention, interconnections of those configurations, and functions of those configurations.

SUMMARY OF THE INVENTION

Therefore, the present invention has been made in view of the incomplete invention disclosed in the above mentioned publication, and an object of the invention is to provide a visual power creating apparatus for allowing visually handicapped or blind persons having a variety of eye problems to recognize an object in a real time and in the form of an image having the same size as the actual size of the object.

In accordance with the present invention, this object is accomplished by providing a visual power creating apparatus comprising: a Charge Coupled Device (CCD) camera for picking up an image of an object; a Thin Film Transistor Liquid Crystal Display (TFT LCD) monitor for displaying the image picked up by the CCD camera; a light source for illuminating the TFT LCD monitor at a rear side of the TFT LCD monitor and adapted to increase an illuminance of the image displayed on the TFT LCD monitor; means for supplying electric power to the CCD camera and the TFT LCD monitor; means for transmitting the image from the CCD camera to the TFT LCD monitor; and an optical system for enlarging the image displayed on the TFT LCD monitor to an actual size of the object.

The light source may comprise a halogen lamp, and an optical cable for transmitting light emitted from the halogen lamp.

The visual power creating apparatus may further comprise means for adjusting the illuminance of a light illuminating the TFT LCD monitor.

Preferably, the visual power creating apparatus comprise means for switching image to be transmitted to the TFT LCD monitor to thereby cut off the transmission of the image from the CCD camera to the TFT LCD monitor and to transmit an image reproduced from an image medium, separate from the CCD camera, to the TFT LCD monitor.

The optical system comprises a first lens group consisting of a plurality of lenses and serving to primarily enlarge the image displayed on the TFT LCD monitor, a pair of mirrors for reflecting an image emerging from the first lens group, and a second lens group consisting of a plurality of lenses and serving to secondarily enlarge the image emerging from a downstream one of the mirrors.

Preferably, the first lens group is adjustable in position with respect to the TFT LCD monitor in order to allow the image displayed on the TFT LCD monitor to be accurately focused onto the retina even when the user has a disorder of his crystalline lens.

At least one of the mirrors may also be tiltable. In this case, a blind person, who has a retina with optic nerves having a more or less sensitivity, can be allowed to accurately focus the image displayed on the TFT LCD monitor onto those optic nerves.

A filter is disposed between the TFT LCD monitor and the light source in order to filter long-wavelength components of the light emitted from the light source. Accordingly, a blind person can realistically recognize the image displayed on the TFT LCD monitor, nearly as in normal persons.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1:
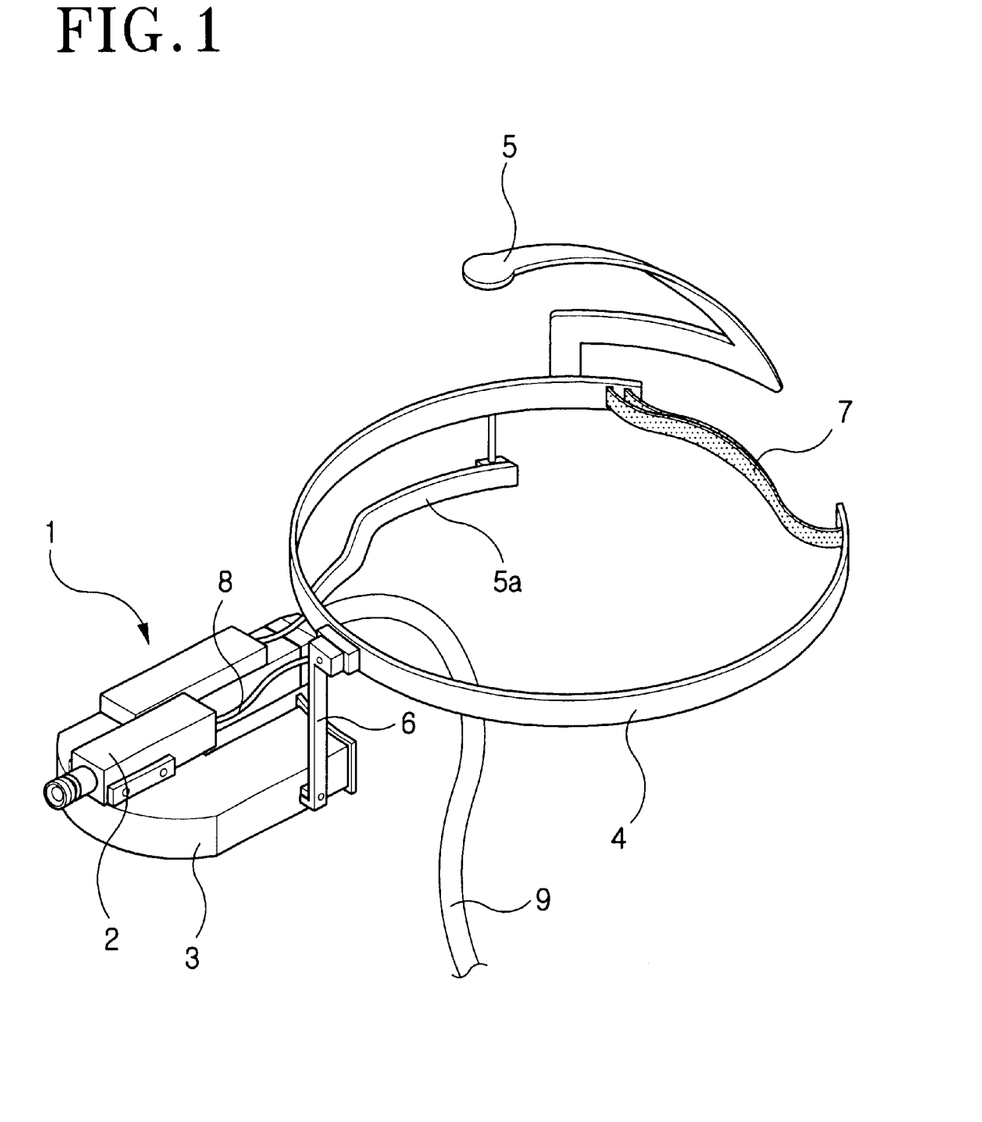
FIG. 1 is a perspective view schematically illustrating an apparatus for creating visual power of a blind person in accordance with an embodiment of the present invention.

FIG. 1 is a perspective view schematically illustrating an apparatus for creating visual power of a blind person in accordance with an embodiment of the present invention. As shown in FIG. 1, the visual power creating apparatus, which is denoted by the reference numeral 1, includes a charge coupled device (CCD) camera 2. This CCD camera 2 is mounted to a body of the visual power creating apparatus 1. The apparatus body is denoted by the reference numeral 3 in FIG. 1. The visual power creating apparatus 1 may include a C-shaped holding member 4 attached to the apparatus body 3 in order to allow the apparatus 1 to be worn on the head of the user. The holding member 4 may have the form of, for example, a headband.

An elastic member 7 such as a rubber strip may be connected between both ends of the holding member 4 in order to prevent the apparatus 1 from slipping down in a state held on the head of the user due to the weight thereof. The holding member 4 may be additionally provided with a pair of first assistant holding members 5 adapted to be put over the crown of the user's head and a pair of second assistant holding members 5a respectively adapted to be put on the ears of the user, like as the bows of glasses. By virtue of such configurations, the visual power creating apparatus can be held in position on the head of the user. A grasp opening 21 may also be provided at the apparatus body 3 in order to allow the apparatus 1 to be used like as a camcorder.

Figure 2:
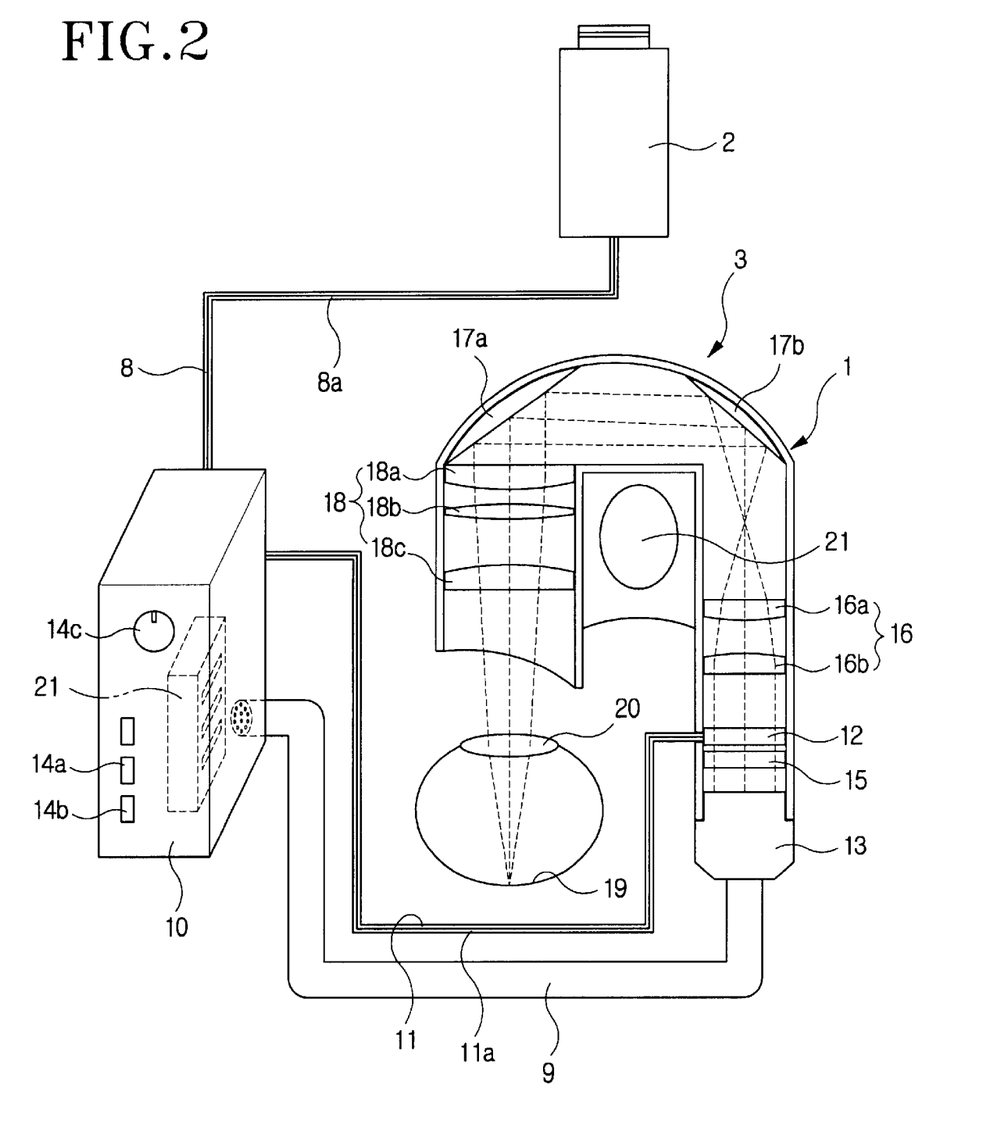
FIG. 2 is a view schematically illustrating the configuration of the visual power creating apparatus shown in FIG. 1 along with an optical path defined by the apparatus.

Referring to FIG. 2, a control box 10 is illustrated in which means for supplying electric power to the CCD camera 2 and a TFT LCD monitor 12 is received. The control box 10 serves as an image transfer means for transferring an image, picked up by the CCD camera 3, to the TFT LCD monitor 12. The control box 10 has a construction separate from the apparatus body 3 so that it is portable independently of the apparatus body 3. The power supply means supplies electric power to the CCD camera 2 and TFT LCD monitor 12 via lines 8a and 11a in accordance with switching operations of power supply switches 14a and 14b provided at the control box 10. The CCD camera 2 picks up, in a real time, an image of a figure or picture developed in front, and then transfers the picked-up image to the control box 10 via a video line 8. The image transmitted to the control box 10 is then transmitted to the TFT LCD monitor 12 provided at the apparatus body 3 via an image transmission line 11 connected between the control box 10 and the apparatus body 3, so that it is displayed on the TFT LCD monitor 12.

On the other hand, a halogen lamp 21 is disposed in the interior of the control box 10. Light emitted from the halogen lamp 21 is transmitted to the apparatus body 3 via an optical cable 9 connected between the control box 10 and the apparatus body 3 so that it is used as a back light required by virtue of the configuration of the TFT LCD monitor 12.

A light source 13 is provided at the apparatus body 3. The light source 13 includes the optical cable 9 and halogen lamp 21 as its constituting elements. The optical cable 9, which consists of a bundle of optical fibers, has trimmed ends. The illuminance of light emitted from the light source 13 onto the TFT LCD monitor 12 is controlled by a switch 14c provided at the control box 10, based on a state of the optic nerve of a blind person using the apparatus 1. The illuminance of light emitted from the light source 13, that is, light emitted from the halogen lamp 21 via the optical cable 9 is about 6,000 to 7,000 luces or more which corresponds to 90 to 120 times the visible illuminance for normal persons. Since the optical cable 9 is used for the light source 13, heat generated from the halogen lamp 21 is prevented from being transferred to the TFT LCD monitor 12. Preferably, the light emitted from the light source 13 has a wavelength ranging from about 5,800□ to 6,000□.

The control box has connection terminals (not shown) for providing a connection to a computer, video tape recorder, or television. Accordingly, the TFT LCD monitor 12 of the visual power creating apparatus 1 according to the present invention can receive not only images picked up by the CCD camera 2, but also images reproduced by a computer, video tape recorder, or television, via the image transmission line 11, so that a blind person can view those images reproduced by the computer, video tape recorder or television.

Where the control box 10 is in a state connected with a computer, video tape recorder or television, it is prevented from receiving images picked up by the CCD camera 2 and transmitted thereto via the video line 8. Accordingly, the control box 10 allows a blind person to view images reproduced by the computer, video tape recorder or television.

The TFT LCD monitor 12, which displays an image picked up by the CCD camera 2 or an image reproduced by the computer, video tape recorder or television, is maintained at an illuminance allowing a blind person to easily view the image displayed on the TFT LCD monitor 12, in accordance with the illuminance of light emitted from the light source 13 and controlled by the control box 10. The TFT LCD monitor 12 comprises a color TFR LCD in order to allow a blind person to realistically recognize the image displayed thereon when viewing that image.

The light emitted from the light source 13 is filtered by a light filter 15 disposed between the light source 13 and the TFT LCD monitor 12, so that the red components of the light having a relatively long wavelength are filtered. Accordingly, the image displayed on the TFT LCD monitor 12 is prevented from being reddish. Therefore, a blind person can more accurately recognize the image displayed on the TFT LCD monitor 12.

The image displayed on the TFT LCD monitor 12 is recognized, as that of an actual size, by a blind person in accordance with the function of an optical system included in the apparatus 1. The optical system includes a first lens group 16 consisting of lenses 16a and 16b, a pair of mirrors 17a and 17b, and a second lens group 18 consisting of lenses 18a, 18b, and 18c. The first lens group 16 has the same function as the objective lens of a microscope and serves to primarily enlarge the image displayed on the TFT LCD monitor 12.

Figure 3:
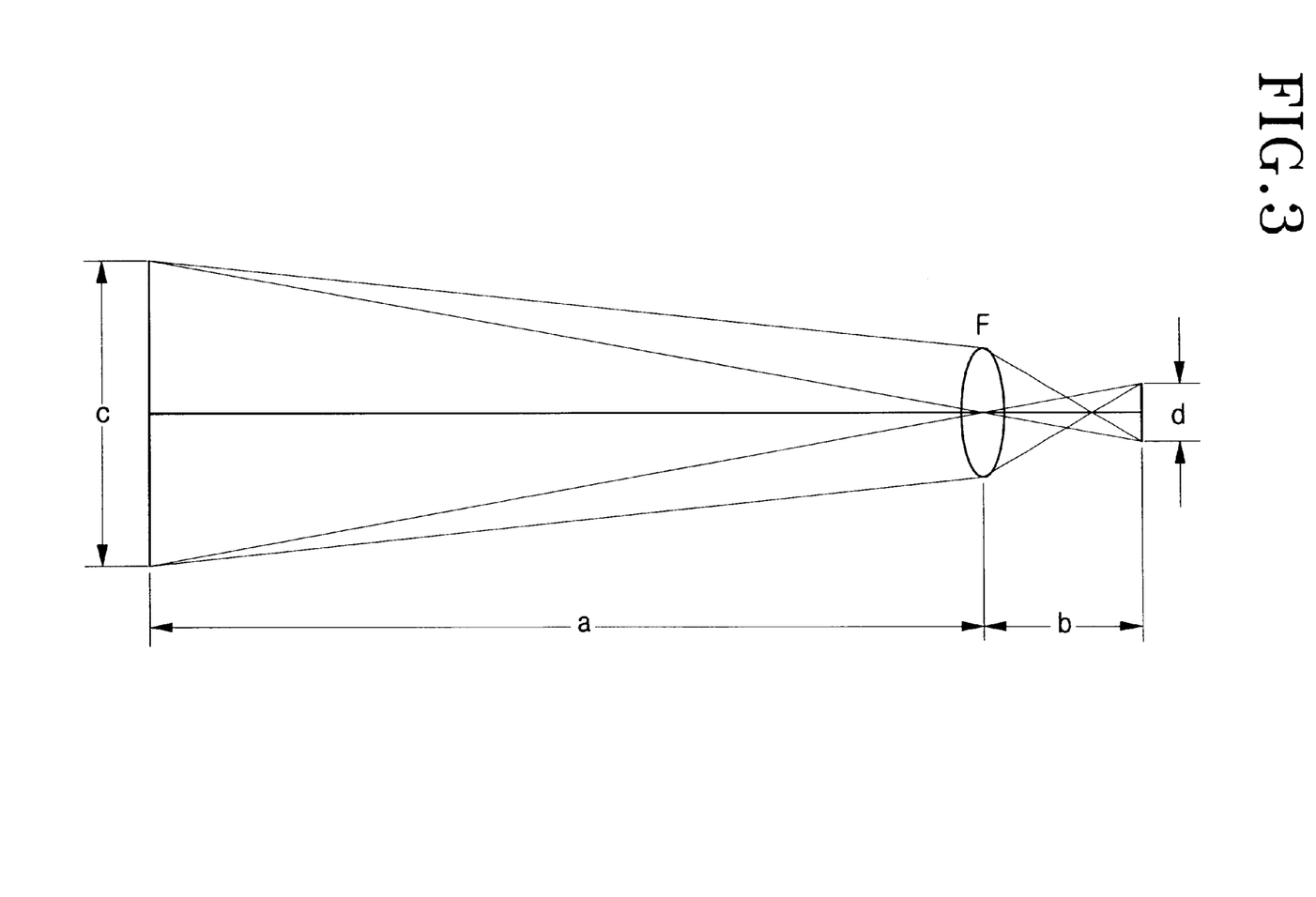
FIG. 3 is a schematic view for explaining a lens equation in order to allow the best understanding of the present invention.

Referring to FIG. 3, an image focused onto the retina of a normal person through the crystalline lens is illustrated. Where the image c of an object having a size of 1 m is focused onto the retina of a normal person spaced apart from the object by a distance of 1 m, the resultant real image on the retina has the size d. The size d of the real image can be determined using a lens equation of "$1/a+1/b=1/f$", where "a" represents the distance between the retina and the object, and "b" represents the distance between the crystalline lens and the retina. In this case, the distance "a" between the retina and the object is 1,000. In FIG. 3, the reference character F denotes the crystalline lens.

Where it is assumed that the crystalline lens of a normal person has a focus length of 3, accordingly, the distance b between the crystalline lens and the retina can be derived. That is, $1/1,000+1/b=1/3$, and thus, $b=1/(1/3-1/1,000)=3.009$. Since the magnification m of the crystalline lens corresponds to b/a (m=b/a), the size d of the real image focused onto the retina is $3.009 [3.009/1,000 \times 1,000 = 3.009]$.

The optical system of the present invention has a configuration capable of establishing the above mentioned lens equation for blind persons, that is, allowing an image focused onto the retina of a blind person to have the same size as that in the case of normal persons. Similar to normal persons, blind persons may have a crystalline lens with a curvature increased or reduced from that of a normal curvature. In other words, blind persons may have a near or farsightedness. Taking into consideration this fact, the first lens group 16 is configured so that it is forwardly and rearwardly movable with respect to the TFT LCD monitor 12 in order to allow an image to be accurately focused onto the retina 19 of a blind person using the visual power creating apparatus 1, in accordance with the present invention. This will be described in detail in conjunction with FIGS. 4a to 4c.

Figure 4A:
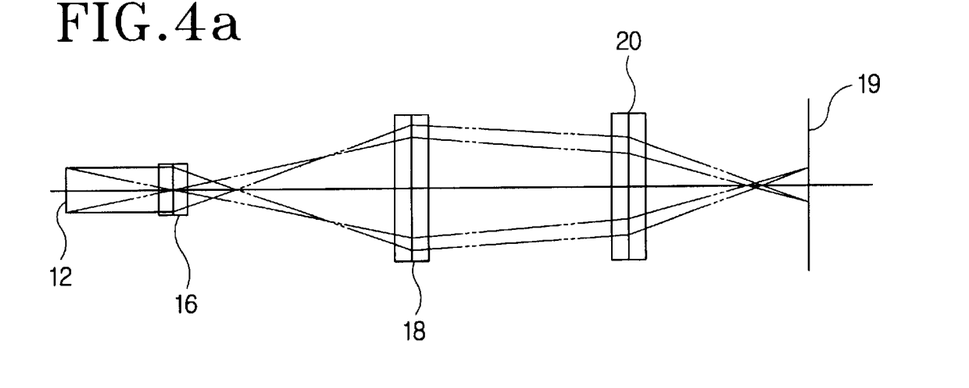
FIGS. 4a to 4c are schematic views respectively illustrating position adjustments for a first lens group included in the visual power creating apparatus of FIG. 1, depending on different crystalline lens curvature conditions.

FIG. 4a illustrates a case in which the crystalline lens has a normal curvature. In this case, the image displayed on the TFT LCD monitor 12 is accurately focused onto the retina 19 at a reference position of the first lens group 16.

Figure 4B:
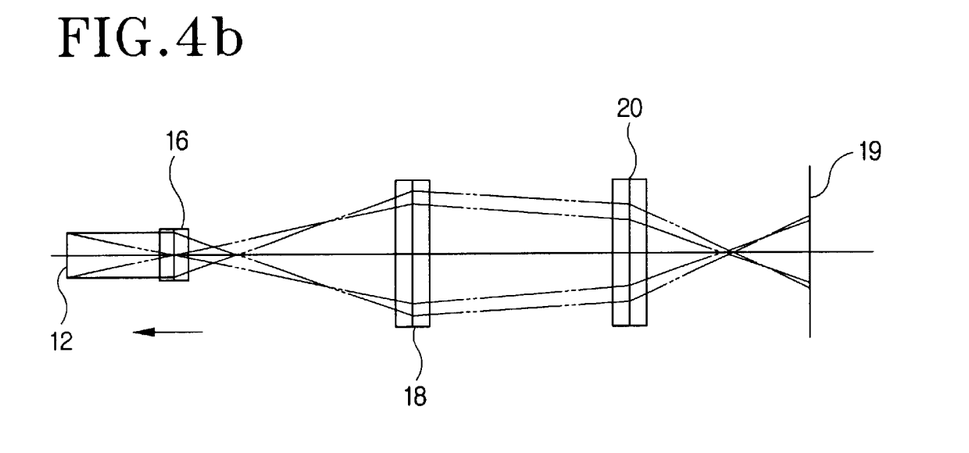

FIG. 4b illustrates a near-sightedness case in which the crystalline lens has a curvature reduced from the normal curvature. In this case, the image displayed on the TFT LCD monitor 12 can be accurately focused onto the retina 19 by appropriately moving the first lens group 16 from the reference position toward the TFT LCD monitor 12.

Figure 4C:
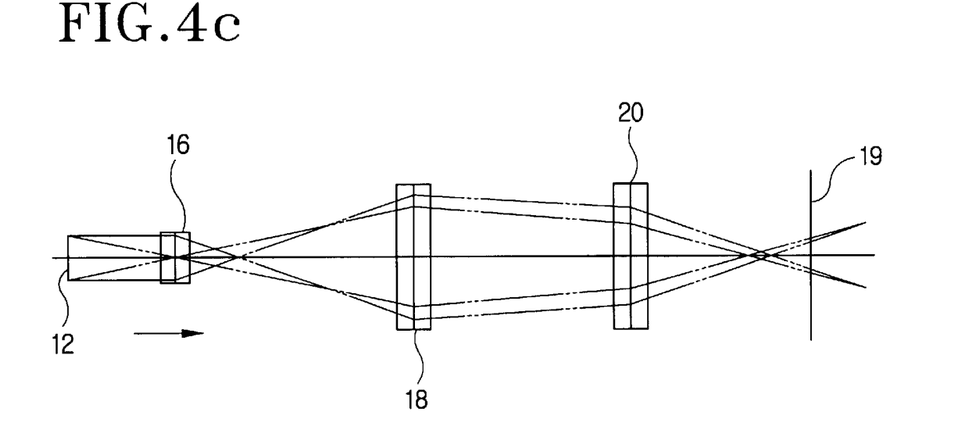

On the other hand, FIG. 4c illustrates a far-sightedness case in which the crystalline lens has a curvature increased from the normal curvature. In this case, the image displayed on the TFT LCD monitor 12 can be accurately focused onto the retina 19 by appropriately moving the first lens group 16 from the reference position toward the second lens group 18.

In order to allow a blind person to realistically recognize the image displayed on the TFT LCD monitor 12, nearly as in normal persons, the optical lens system should be designed to have a rectangular-shaped lens capable of providing a large aperture while eliminating an aberration resulting from such a large aperture. In order to provide an optical lens system capable of such requirements, the first and second lens groups 16 and 18 consist of a plurality of lenses, that is, lenses 16a and 16b; and lenses 18a, 18b, and 18c.

The adjustment for the position of the first lens group 16 depending on the curvature of the crystalline lens of a blind person is conducted when the visual power creating apparatus 1 is initially worn by a blind person. Once the position adjustment for the first lens group 16 is conducted, the first lens group 16 is maintained at the adjusted position.

An image displayed on the TFT LCD monitor 12 is reflected by the mirrors 17a and 17b along an optical path shown in FIG. 2, and then incident to the second lens group 18. The second lens group 18 transmits the incident image to the optic nerve system of a blind person while magnifying again that image. Accordingly, a blind person can recognize the size, figure, and color of the object from the image displayed on the TFT LCD monitor 12 and transmitted to the optic nerve system.

Figure 5:
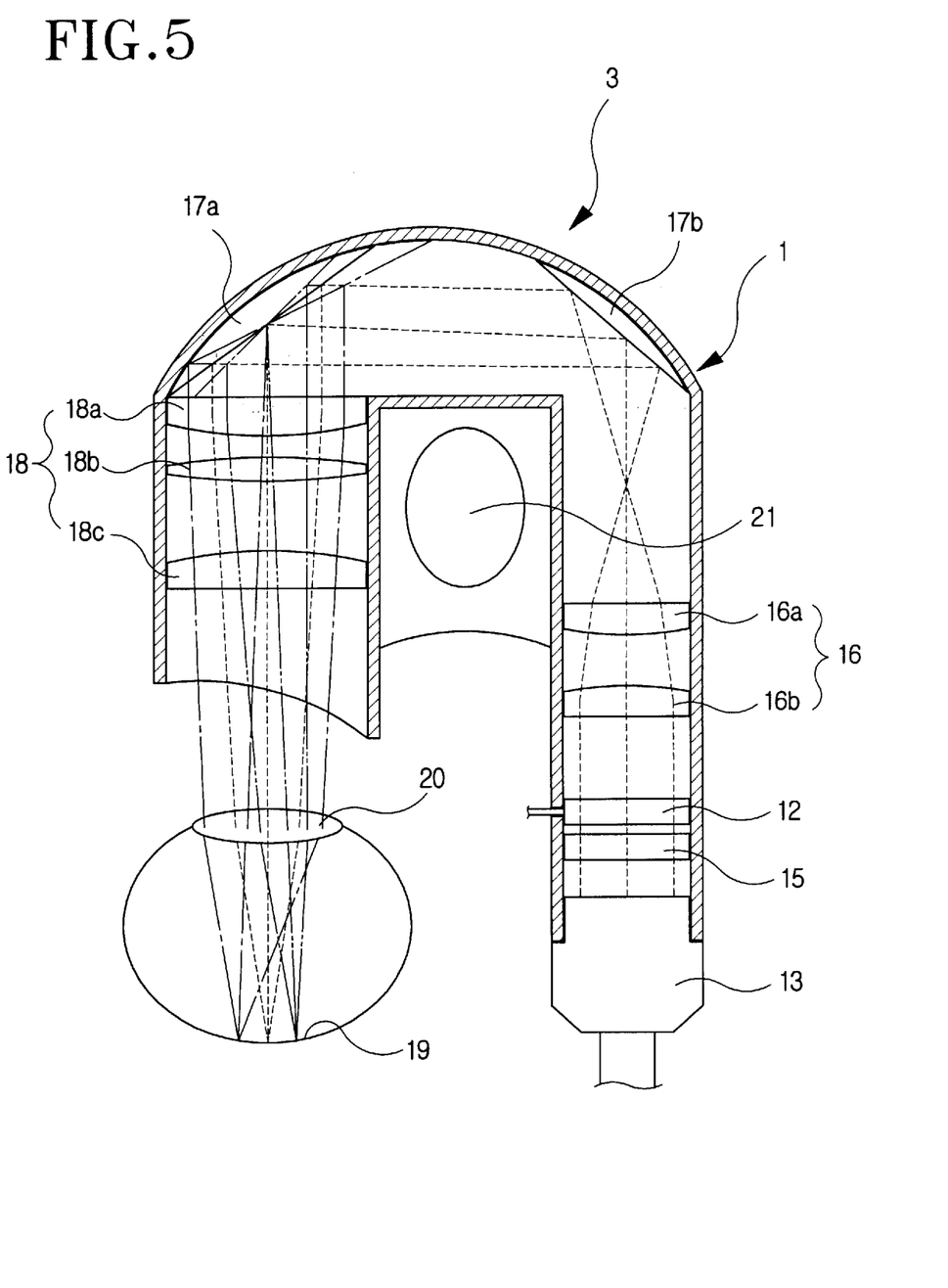
FIG. 5 is a view schematically illustrating a visual power creating apparatus modified from that of FIG. 1 in accordance with the present invention to have at least one tiltable mirror, so that a blind person, who has a retina with optic nerves having more or less sensitivity, is allowed to focus an image onto the optic nerves.

FIG. 5 illustrates a configuration in which at least one of the mirrors 17a and 17b is tiltable. This configuration is applied to a blind person, who has a retina with optic nerves having more or less sensitivity, in order to allow the image displayed on the TFT LCD monitor 12 to be accurately focused onto the optic nerves. Referring to FIG. 5, it can be found that the position of the focused image on the retina 19 is shifted as the tiltable mirror, that is, the mirror 17b, is tilted. When the image is focused onto a portion of the retina 19, where there are optic nerves having more or less sensitivity, during a tilting of the mirror 17b, the adjustment for the mirror 17b is completed so that the mirror 17b is maintained at a corresponding position.

As apparent from the above description, the visual power creating apparatus 1 of the present invention can be adjusted in accordance with the condition of a blind person, who uses the apparatus, in order to allow a blind person to accurately recognize the image displayed on the TFT LCD monitor 12.

For example, for a blind person having a disorder of his optic nerve system, the switch 14c is adjusted to control the illuminance of light emitted from the light source 13 onto the TFT LCD monitor 12, thereby allowing a blind person to optimally recognize the displayed image. For a blind person having a disorder of the curvature of his crystalline lens 20, the position of the first lens group 16 with respect to the TFT LCD monitor 12 is adjusted to allow a blind person to optimally recognize the displayed image. Also, for a blind person having a partial disorder of his retina 19, it is possible to allow the blind person to optimally recognize the image displayed on the TFT LCD monitor 12 in accordance with an appropriate tilting of the mirror 17b or the mirrors 17a and 17b.

Although not shown, the power source adapted to supply electric power to the visual power creating apparatus 1 according to the present invention may have the form of a battery attachable to a jacket which the user wears. In this case, the power source can be easily carried by the user in that the user wears the jacket attached with the battery.

Figure 6:
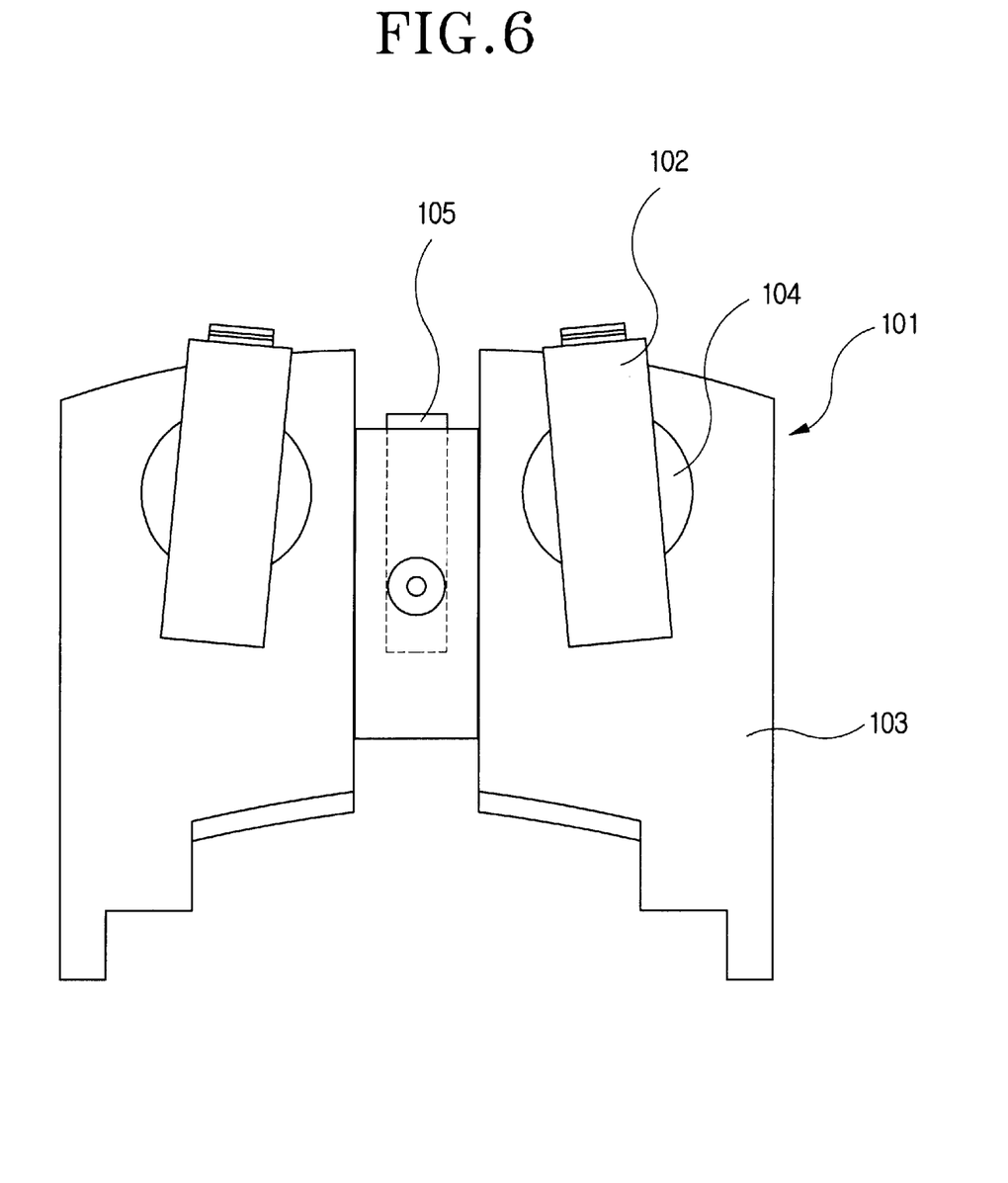
FIG. 6 is a schematic view illustrating a visual power creating apparatus for a blind person which has a binocular construction in accordance with another embodiment of the present invention, in order to allow a blind person to stereoscopically sense an object.

FIG. 6 is a schematic view illustrating a visual power creating apparatus for a blind person which has a binocular construction in accordance with another embodiment of the present invention, in order to allow a blind person to stereoscopically sense an object.

As shown in FIG. 6, the visual power creating apparatus, which is denoted by the reference numeral 101, includes a pair of apparatus bodies 103 each having the same inner configuration as that of FIG. 1, and a pair of CCD monitors 102 each mounted to an associated one of the apparatus bodies 103 and adapted to pick up an image displayed on the TFT LCD received in the associated apparatus body 103. The apparatus bodies 103 are coupled together in the form of a binocular construction. Each CCD monitor 102 is rotatable in a desired angle range by a rotating drive 104 such as an electric motor. An infrared sensor 105 is arranged at the connection between the apparatus bodies 103. The rotating drive 104 operates based on a signal generated from the infrared sensor 105 as a result of sensing an object, so that it rotates to direct the CCD monitors 102 toward the sensed object while keeping the desired angle of each CCD monitor 102 with respect to the object.

As mentioned above, the visual power creating apparatus according to the present invention, which is a mechanism for creating a visual ability for blind persons, is designed to have an adjustability so that it can be appropriately used for blind persons having various eye problems after being adjusted in accordance with the eye problem of a blind person using the apparatus. The principle of the visual power creating apparatus of the present invention is to accurately transmit rays of light having the form of an image to the optic nerve of the retina of a blind person by use of a specific illumination system and an optical system having a function for adjusting the illumination system, thereby creating a visual ability for a blind person.

In accordance with the visual power creating apparatus of the present invention, the image of an object picked up by the CCD camera externally mounted to the apparatus body is transmitted in a real time to the TFT LCD monitor mounted in the interior of the apparatus body via the portable control box, so that it is displayed on the TFT LCD monitor. The displayed image is primarily enlarged by the first lens group of the optical system internally mounted in the apparatus body, and then secondarily enlarged by the second lens group, so that it is focused onto the retina of a blind person via the crystalline lens. Accordingly, the blind person can sense the darkness and brightness of the displayed image, so that he can recognize the displayed image in the form of an image having the same size as the actual size of the object.

As apparent from the above description, the visual power creating apparatus of the present invention allows a blind person not only to recognize the shape of an object, but also to recognize any image reproduced by a television, video tape recorder, computer, game machine, or TFT LCD monitor. Where the visual power creating apparatus of the present invention is provided with a low light camera, it is possible to achieve a search for an object even at a low illuminance. On the other hand, where a zoom lens camera is used, it is possible to obtain an effect of viewing an object positioned at a great distance.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A visual power creating apparatus comprising:
   a Charge Coupled Device (CCD) camera for picking up an image of an object;
   a Thin Film Transistor Liquid Crystal Display (TFT LCD) monitor for displaying the image picked up by the CCD camera;
   a light source for illuminating the TFT LCD monitor at a rear side of the TFT LCD monitor and adapted to increase an illuminance of the image displayed on the TFT LCD monitor;
   means for supplying electric power to the CCD camera and the TFT LCD monitor;
   means for transmitting the image from the CCD camera to the TFT LCD monitor; and
   an optical system for enlarging the image displayed on the TFT LCD monitor to a size corresponding to an actual size of the object.

2. A visual power creating apparatus, comprising:
   a Charge Coupled Device (CCD) camera for picking up an image of an object;
   a Thin Film Transistor Liquid Crystal Display (TFT LCD) monitor for displaying the image picked up by the CCD camera;
   a light source for illuminating the TFT LCD monitor at a rear side of the TFT LCD monitor and adapted to increase an illuminance of the image displayed on the TFT LCD monitor;
   means for supplying electric power to the CCD camera and the TFT LCD monitor;
   means for transmitting the image from the CCD camera to the TFT LCD monitor; and
   an optical system for enlarging the image displayed on the TFT LCD monitor to an actual size of the object, wherein the light source comprises a halogen lamp, and an optical cable for transmitting light emitted from the halogen lamp.

3. A visual power creating apparatus, comprising:
   a Charge Coupled Device (CCD) camera for picking up an image of-an object;

a Thin Film Transistor Liquid Crystal Display (TFT LCD) monitor for displaying the image picked up by the CCD camera;

a light source for illuminating the TFT LCD monitor at a rear side of the TFT LCD monitor and adapted to increase an illuminance of the image displayed on the TFT LCD monitor;

means for supplying electric power to the CCD camera and the TFT LCD monitor;

means for transmitting the image from the CCD camera to the TFT LCD monitor;

an optical system for enlarging the image displayed on the TFT LCD monitor to an actual size of the object; and, means for adjusting an illuminance of the light illuminating the TFT LCD monitor.

4. The visual power creating apparatus according to claim 1, further comprising:

means for switching image to be transmitted to the TFT LCD monitor to thereby cut off the transmission of the image from the CCD camera to the TFT LCD monitor and to transmit an image reproduced from an image medium, separate from the CCD camera, to the TFT LCD monitor.

5. A visual power creating apparatus comprising:

a Charge Coupled Device (CCD) camera for picking up an image of an object;

a Thin Film Transistor Liquid Crystal Display (TFT LCD) monitor for displaying the image picked up by the CCD camera;

a light source for illuminating the TFT LCD monitor at a rear side of the TFT LCD monitor and adapted to increase an illuminance of the image displayed on the TFT LCD monitor;

means for supplying electric power to the CCD camera and the TFT LCD monitor;

means for transmitting the image from the CCD camera to the TFT LCD monitor; and, an optical system for enlarging the image displayed on the TFT LCD monitor to an actual size of the object, wherein the optical system comprises:

a first lens group consisting of a plurality of lenses and serving to primarily enlarge the image displayed on the TFT LCD monitor;

a pair of mirrors for reflecting an image emerging from the first lens group; and a second lens group consisting of a plurality of lenses and serving to secondarily enlarge the image emerging from a downstream one of the mirrors.

6. The visual power creating apparatus according to claim 5, wherein the first lens group is adjustable in position with respect to the TFT LCD monitor.

7. The visual power creating apparatus according to claim 5, wherein at least one of the mirrors is tiltable.

8. A visual power creating apparatus comprising:

a Charge Coupled Device (CCD) camera for picking up an image of an object;

a Thin Film Transistor Liquid Crystal Display (TFT LCD) monitor for displaying the image picked up by the CCD camera;

a light source for illuminating the TFT LCD monitor at a rear side of the TFT LCD monitor and adapted to increase an illuminance of the image displayed on the TFT LCD monitor;

means for supplying electric power t6 the CCD camera and the TFT LCD monitor;

means for transmitting the image from the CCD camera to the TFT LCD monitor;

an optical system for enlarging the image displayed on the TFT LCD monitor to an actual size of the object; and, a filter disposed between the TFT LCD monitor and the light source and adapted to filter long-wavelength components of the light emitted from the light source.

9. A visual power creating apparatus comprising:

a camera for picking up an image of an object;

a monitor coupled to the camera and being adapted to display the image picked up by the camera; and, an optical system coupled between the camera and the monitor for modifying the image displayed on the monitor to a modified size corresponding to an actual size of the object.

10. A visual power creating apparatus, comprising:

a camera for picking up an image of an object;

a monitor coupled to the camera and being adapted to display the image picked up by the camera; and, an optical system coupled between the camera and the monitor for modifying the image displayed on the monitor to a modified size corresponding to an actual size of the object, the apparatus being adapted to project the image onto the retina of an eye of a person having a disorder in an crystalline lens of the eye.

11. A visual power creating apparatus, as set forth in claim 10, wherein the modified size of the image may be adjusted by the optical system.

* * * * *